(12) United States Patent
Beesabathina et al.

(10) Patent No.: US 9,282,026 B2
(45) Date of Patent: Mar. 8, 2016

(54) SYSTEM AND METHOD FOR IMPROVED ROUTING IN AUTONOMOUS SYSTEMS

(71) Applicant: Dell Products L.P., Round Rock, TX (US)

(72) Inventors: Prasadu Beesabathina, Andhra Pradesh (IN); Perumal NarayanaSwamy, Tamilnadu (IN); Balaji Venkat Venkataswami, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 13/793,200

(22) Filed: Mar. 11, 2013

(65) Prior Publication Data
US 2014/0254423 A1   Sep. 11, 2014

(51) Int. Cl.
*H04L 12/751* (2013.01)
*H04L 12/721* (2013.01)
*H04L 12/715* (2013.01)

(52) U.S. Cl.
CPC ............... *H04L 45/02* (2013.01); *H04L 45/04* (2013.01); *H04L 45/123* (2013.01); *H04L 45/26* (2013.01)

(58) Field of Classification Search
USPC ............... 370/216–220, 229–230, 232–238, 370/242–245, 254–258, 351–356, 400–411, 370/422–430, 902
See application file for complete search history.

(56) References Cited

U.S. PATENT DOCUMENTS

| | | | | |
|---|---|---|---|---|
| 6,631,136 B1* | 10/2003 | Chowdhury | ............ | H04L 45/02 370/395.31 |
| 6,981,055 B1* | 12/2005 | Ahuja | ............ | H04L 45/04 370/401 |
| 7,068,624 B1* | 6/2006 | Dantu | ............ | H04L 12/5695 370/331 |
| 7,180,864 B2* | 2/2007 | Basu | ............ | H04L 45/52 370/238 |
| 7,286,468 B2* | 10/2007 | Scudder | ............ | H04L 45/02 370/219 |
| 7,581,022 B1* | 8/2009 | Griffin | ............ | H04L 45/04 370/238 |
| 7,647,426 B2* | 1/2010 | Patel | ............ | H04L 45/00 370/238 |
| 7,904,586 B1* | 3/2011 | Griffin | ............ | H04L 45/00 709/238 |
| 7,957,306 B2* | 6/2011 | Bryant | ............ | H04L 45/02 370/252 |
| 7,969,898 B1* | 6/2011 | Raj | ............ | H04L 12/462 370/242 |
| 7,990,881 B2* | 8/2011 | Buskens | ............ | H04L 45/00 370/248 |

(Continued)

*Primary Examiner* — Jeffrey M Rutkowski
*Assistant Examiner* — Jonathan B Wood
(74) *Attorney, Agent, or Firm* — Haynes and Boone LLP

(57) ABSTRACT

A system and method for improved routing in autonomous systems includes identifying one or more first edge routers for an autonomous system, selecting one or more second edge routers from the one or more first edge routers, determining a third edge router, forming a first edge router list including all of the one or more second edge routers except for the third edge router, forming a first reachability message, and transmitting the first reachability message. A first prefix is reachable using the one or more second edge routers. The third edge router is associated with a first path for reaching the first prefix. The third edge router is selected from the one or more second edge routers. The first path is a best path for reaching the first prefix. The reachability message includes the first prefix, information associated with the first path, and the first edge router list.

19 Claims, 6 Drawing Sheets

(56) References Cited

U.S. PATENT DOCUMENTS

| | | | |
|---|---|---|---|
| 8,089,968 B2 * | 1/2012 | Filsfils | H04L 45/02 370/238 |
| 8,125,929 B2 * | 2/2012 | Xia | H04L 45/02 370/254 |
| 8,325,720 B2 * | 12/2012 | Gao et al. | 370/389 |
| 2004/0010617 A1 * | 1/2004 | Akahane | H04L 12/5695 709/243 |
| 2004/0196846 A1 * | 10/2004 | Salonen | H04L 41/12 370/392 |
| 2006/0126502 A1 * | 6/2006 | Vasseur | H04L 45/04 370/221 |
| 2006/0182119 A1 * | 8/2006 | Li | H04L 12/5695 370/395.52 |
| 2006/0233154 A1 * | 10/2006 | Eckert | H04L 12/1863 370/351 |
| 2007/0091796 A1 * | 4/2007 | Filsfils | H04L 45/00 370/228 |
| 2007/0153707 A1 * | 7/2007 | Thubert | H04L 45/025 370/254 |
| 2007/0233887 A1 * | 10/2007 | Nubani | H04L 45/00 709/230 |
| 2008/0247392 A1 * | 10/2008 | White | H04L 45/04 370/392 |
| 2009/0003232 A1 * | 1/2009 | Vaswani | H04L 45/00 370/252 |
| 2009/0043911 A1 * | 2/2009 | Flammer | H04L 45/00 709/238 |
| 2009/0073993 A1 * | 3/2009 | Qureshi | H04L 45/04 370/401 |
| 2009/0296568 A1 * | 12/2009 | Kitada | H04L 45/00 370/221 |
| 2009/0296579 A1 * | 12/2009 | Dharwadkar | H04L 12/4641 370/235 |
| 2010/0008222 A1 * | 1/2010 | Le Roux | H04L 45/02 370/228 |
| 2010/0039940 A1 * | 2/2010 | Wang | H04L 45/02 370/241 |
| 2011/0044342 A1 * | 2/2011 | Winter | H04L 45/04 370/392 |
| 2011/0173492 A1 * | 7/2011 | Le Roux | H04L 45/00 714/4.11 |
| 2012/0082057 A1 * | 4/2012 | Welin | H04L 12/12 370/252 |
| 2012/0093166 A1 * | 4/2012 | Rosenberg | H04L 45/02 370/401 |
| 2012/0158976 A1 * | 6/2012 | Van der Merwe | H04L 69/16 709/228 |
| 2012/0195204 A1 * | 8/2012 | Patel | H04L 45/00 370/237 |
| 2013/0058345 A1 * | 3/2013 | Kano | H04L 12/4633 370/392 |
| 2013/0176845 A1 * | 7/2013 | Olofsson | H04L 45/22 370/225 |
| 2013/0250949 A1 * | 9/2013 | Farinacci | H04L 12/1836 370/390 |
| 2014/0129734 A1 * | 5/2014 | Vasseur | H04L 45/121 709/241 |
| 2014/0198634 A1 * | 7/2014 | Kumar | H04L 45/00 370/228 |
| 2014/0297875 A1 * | 10/2014 | Cheng | H04L 61/103 709/226 |

* cited by examiner

SYSTEM AND METHOD FOR IMPROVED ROUTING IN AUTONOMOUS SYSTEMS

BACKGROUND

The present disclosure relates generally to information handling systems, and more particularly to improved routing in autonomous systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change.

Accordingly, it would be desirable to provide improved network switching products that can select efficient paths for forwarding and/or routing network traffic through a network.

SUMMARY

According to one embodiment, a method of advertising routes includes identifying one or more first edge routers for an autonomous system, selecting one or more second edge routers from the one or more first edge routers, determining a third edge router, forming a first edge router list including all of the one or more second edge routers except for the third edge router, forming a first reachability message, and transmitting the first reachability message. A first prefix is reachable using the one or more second edge routers. The third edge router is associated with a first path for reaching the first prefix. The third edge router is selected from the one or more second edge routers. The first path is a best path for reaching the first prefix. The reachability message includes the first prefix, information associated with the first path, and the first edge router list.

According to another embodiment, a method of routing includes receiving a first reachability message including a first prefix, information associated with a first path for reaching the first prefix, and a first edge router list, the first prefix being reachable using any edge router in the first edge router list; determining one or more first edge routers based on information associated with the first reachability message, the one or more first edge routers being part of an autonomous system; selecting a second edge router from the one or more first edge routers based on information associated with routing costs to the one or more first edge routers; receiving network traffic for the first prefix; and routing the network traffic for the first prefix toward the selected second edge router.

According to yet another embodiment, an information handling system includes a communications network. The communications network includes a router. The router is configured to identify one or more first edge routers for an autonomous system; select one or more second edge routers from the one or more first edge routers, a prefix being reachable using the one or more second edge routers; determine a third edge router, the third edge router being associated with a path for reaching the prefix, the third edge router being selected from the one or more second edge routers, and the path being a best path for reaching the prefix; forming an edge router list including all of the one or more second edge routers except for the third edge router; forming a reachability message including the prefix, information associated with the path, and the edge router list; and transmitting the reachability message.

Figure 1:
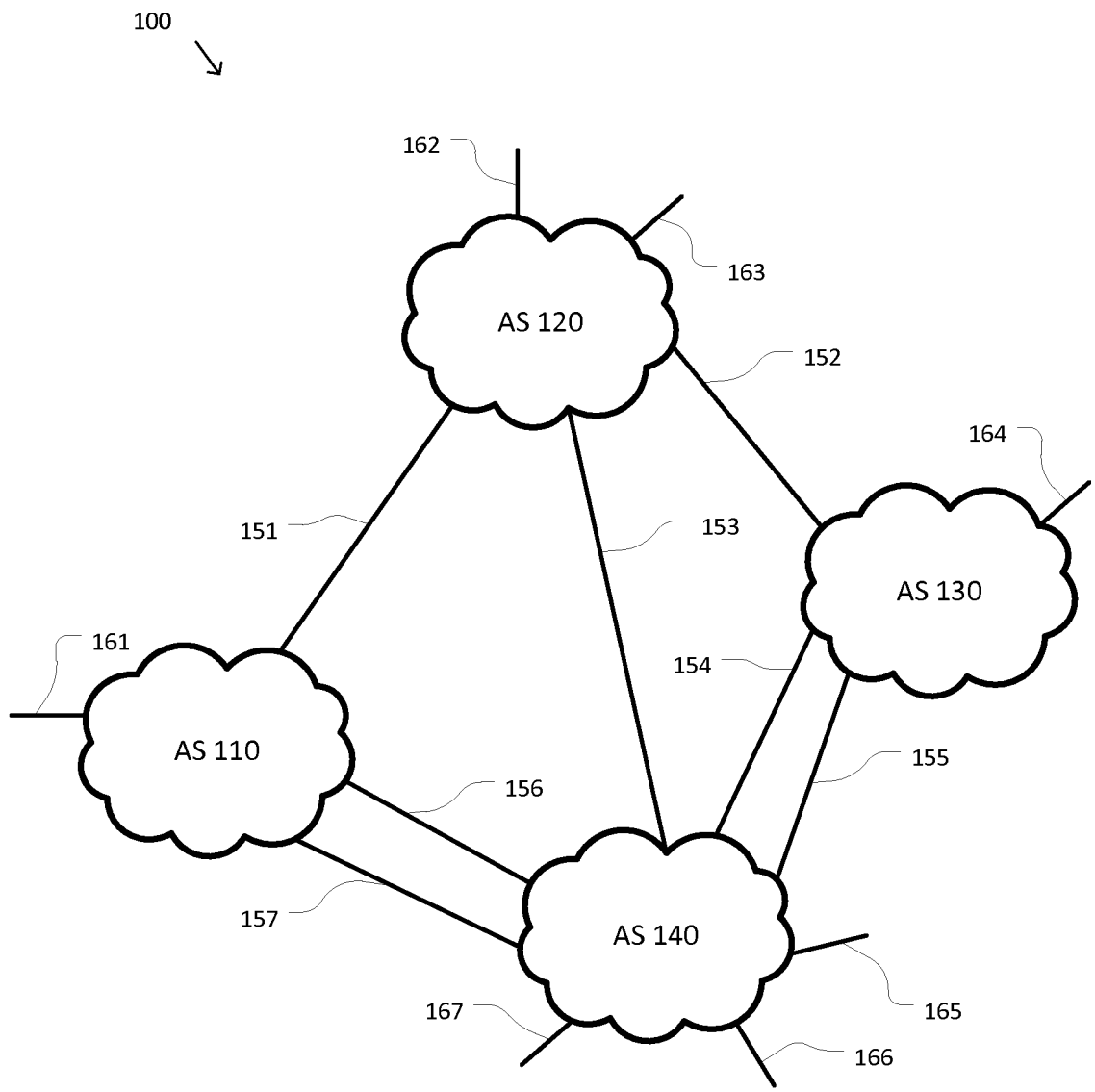
FIG. 1 is a simplified diagram of a hierarchical network according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Fast and efficient forwarding of network traffic by an IHS and/or a network switching unit is an important feature of most networks. The ability to direct network traffic from one network switching unit to another network switching unit that are great distances apart is part of what makes networks so useful and powerful.

The term "routing" is used, without loss of generality, to refer to any type of routing, switching, forwarding, and/or networking function where a network device makes a decision regarding a path network traffic may take through a network. Similarly, the term "router" is used, without loss of generality, to refer to any type of network switching device that performs any type of routing, switching, forwarding, and/or networking function where a network device makes a decision regarding a path network traffic may take through a network. Thus, a router that routes traffic may also refer to a switch that switches network traffic, a network switching unit that forwards network traffic, etc.

As the number of routers or other devices on a network increases, the number of possible destinations for network traffic and the number of possible interconnections between the routers and/or the other devices can become unmanageable. For example, under Internet Protocol version 4 (IPv4), 32 bits are used to designate a device or IP address. This means that a network using IPv4 may support in excess of 4 billion addresses and/or devices. Thus, a router that is trying to keep track of routes to all of the other devices in the network may need to keep track of as many as 4 billion devices. When all of the other devices in the network are also considered, this means that there as many as 16 quintillion ($16 \times 10^{18}$) possible interconnections in the network. This does not even take into consideration a total number of possible paths through the network that may be the result of parallel connections between routers and/or devices. In IPv6, 128 bits are used to designate a device resulting in approximately $3.4 \times 10^{38}$ possible devices and over $10^{77}$ possible interconnections. It is not practical to keep track of all of these devices and interconnections individually. One solution for handling the large numbers of devices and interconnections is to organize the network hierarchically.

FIG. 1 is a simplified diagram of a hierarchical network 100 according to some embodiments. As shown in FIG. 1, the network 100 is organized hierarchically. This may be done by dividing the network 100 into sub-networks called autonomous systems. In some examples, an autonomous system may have responsibility for routing network traffic between points within the autonomous system and for routing traffic to other adjacent autonomous systems.

As shown in FIG. 1, the network 100 includes four autonomous systems 110, 120, 130, and 140. The autonomous system 110 is coupled to the autonomous system 120 through a network link 151. And, although FIG. 1 depicts that network link 151 couples autonomous system 110 with autonomous system 120, it may actually couple a first edge router in the autonomous system 110 with a second edge router in the autonomous system 120. The first and second edge routers are called edge routers because they are on the edge of their respective autonomous systems and may have responsibility for routing network traffic between the autonomous systems using network links such as network link 151. Similarly, the autonomous system 120 is coupled to the autonomous system 130 using a network link 152 and is also coupled to the autonomous system 140 using a network link 153. Likewise, the autonomous system 130 is coupled to the autonomous system 140 using network links 154 and/or 155. In some examples, either of the network links 154 and 155 may be used to route network traffic between the autonomous systems 130 and 140. Additionally, the autonomous systems 110 and 140 are coupled using network links 156 and 157.

The autonomous systems 110, 120, 130, and 140 may also be coupled to other autonomous systems in the network 100 that are not shown. Autonomous system 110 may be coupled to these other autonomous systems using a network link 161. Similarly, autonomous system 120 may be coupled using network links 162 and 163, autonomous system 130 may be coupled using network link 164, and autonomous system 140 may be coupled using network links 165, 166, and 167.

Under a hierarchical model using autonomous systems, network traffic may be routed using an iteratively applied two-step routing strategy. In a first step of the two-step routing strategy, network traffic may be routed within a first autonomous system to a first edge router. In a second step of the two-step routing strategy, the first edge router routes the network traffic to a second autonomous system using a network link to a second edge router in the second autonomous system. The second autonomous system then routes the network traffic to a third autonomous system using the two-step routing strategy, and the process repeats until the network traffic arrives at a destination autonomous system that includes a final destination for the network traffic. Once the network traffic arrives at the destination autonomous system, it is routed within the destination autonomous system to the final destination. In some examples, the first step in the two-step routing strategy may be performed with the aid of an interior gateway protocol (IGP). In some examples, the second step in the two-step routing strategy may be performed with the aid of a border gateway protocol (BGP).

Figure 2:
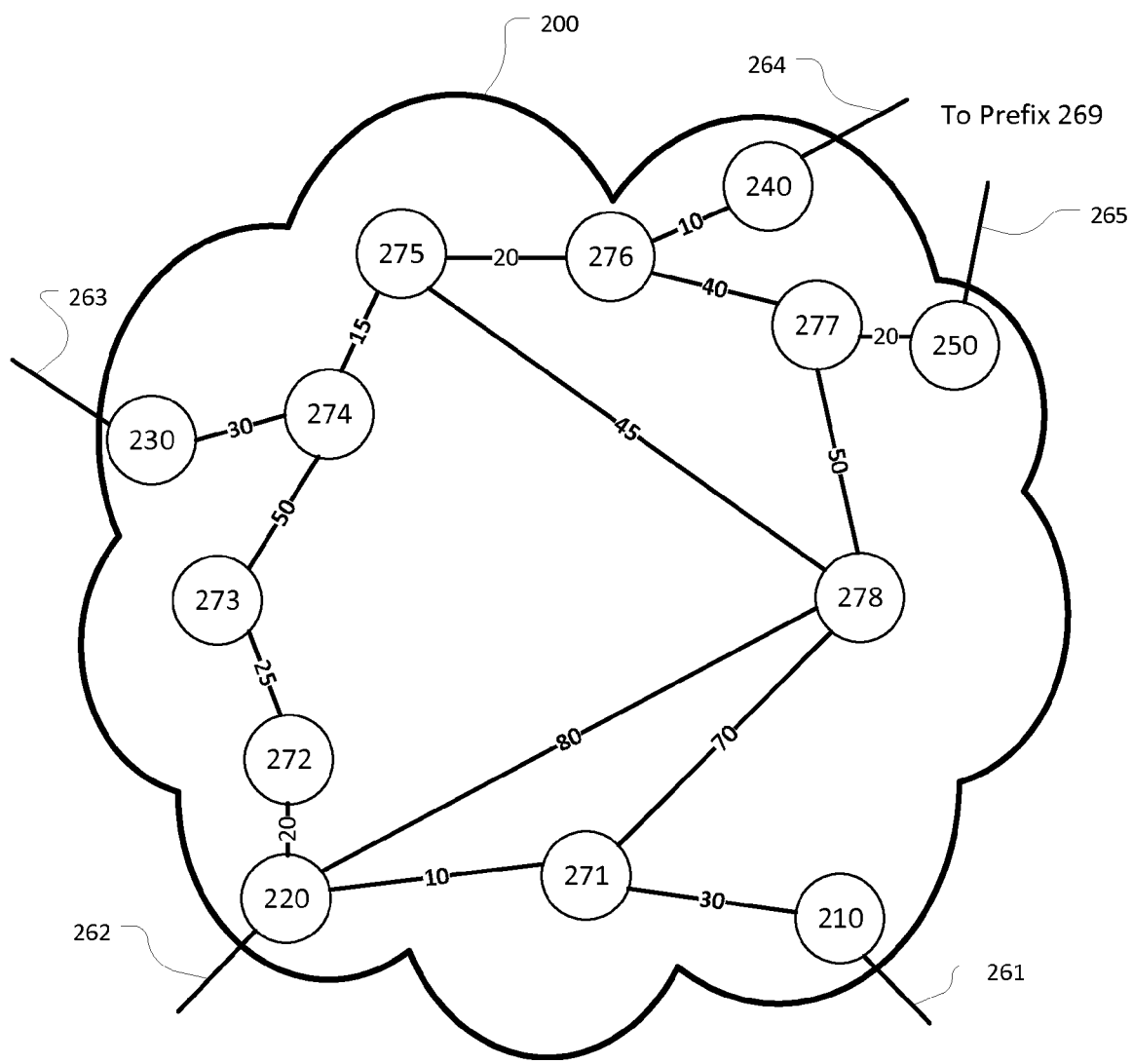
FIG. 2 is a simplified diagram of an autonomous system according to some embodiments.

FIG. 2 is a simplified diagram of an autonomous system 200 according to some embodiments. In some examples the autonomous system 200 may be any one of the autonomous systems 110, 120, 130, and/or 140 of FIG. 1. As shown in FIG. 2, the autonomous system 200 includes both edge routers and non-edge routers. The edge routers include the routers 210, 220, 230, 240, and 250. The routers 210, 220, 230, 240, and 250 are edge routers because they are coupled to other autonomous systems using network links 261, 262, 263, 264, and 265, respectively. Additionally, the edge routers 240 and 250 couple the autonomous system 200 to one of the other autonomous systems with a prefix 269. In some examples, the prefix 269 may be used to designate a common element in addresses of routers included in the autonomous system with prefix 269. The non-edge routers include routers 271-278. The routers 271-278 are non-edge routers because they are not directly coupled to any of the other autonomous systems.

Each of the routers, both edge and non-edge, are coupled within the autonomous system 200 using various network links, with each of the network links being shown with a routing cost. In some examples, the routing cost may indicate the relative cost of routing network traffic using the corresponding network link. In some examples, this routing cost may be associated with the speed with which the network link may transmit the network traffic. For example, the router 210 is coupled to the router 271 using a network link with a routing cost of 30 and the router 275 is coupled to the router 278 using a network link with a routing cost of 45.

In some examples, when the routers within the autonomous system 200 make decisions with respect to a path on which to forward network traffic, the routers may consider the routing cost. For example, the autonomous system 200 includes four different paths, without loops, for routing network traffic between router 274 and router 278. A first path may route the network traffic through routers 273, 272, 220, and 271 to get to router 278. This is a five hop path and has a cost of 50 (274 to 273) plus 25 (273 to 272) plus 20 (272 to 220) plus 10 (220 to 271) plus 70 (271 to 278) for a total cost of 175. A second path may route the network traffic through routers 273, 272, and 220 to get to router 278 and has four hops and a cost of 175. A third path may route the network traffic through routers 275 to get to router 278 and has two hops and a cost of 60. A fourth path may route the network traffic through routers 275, 276, and 277 to get to router 278 and has four hops and a cost of 125. In some examples, the third path is a preferred path between routers 274 and 278 because it has a lowest cost of 60 among each of the four different paths. Similar paths and costs may be determined between any two routers within the autonomous system.

As discussed above and further emphasized here, FIG. 2 is merely an example, which should not unduly limit the scope of the claims. One of ordinary skill in the art would recognize many variations, alternatives, and modifications. According to some embodiments, any of the edge routers 210, 220, 230, 240, and/or 250 may be coupled to more than one of the other autonomous systems using corresponding network links. According to some embodiments, any of the edge routers 210, 220, 230, 240, and/or 250 may be coupled to one or more other edge routers in a same one of the other autonomous systems using corresponding network links. According to some embodiments, the network link 264 may couple the autonomous system 200 to a first one of the other autonomous systems and the network link 265 may couple the autonomous system 200 to a second one of the other autonomous systems, different from the first one. In some examples, the first autonomous system and the second autonomous system may provide alternate paths to the prefix 269.

Figure 3:
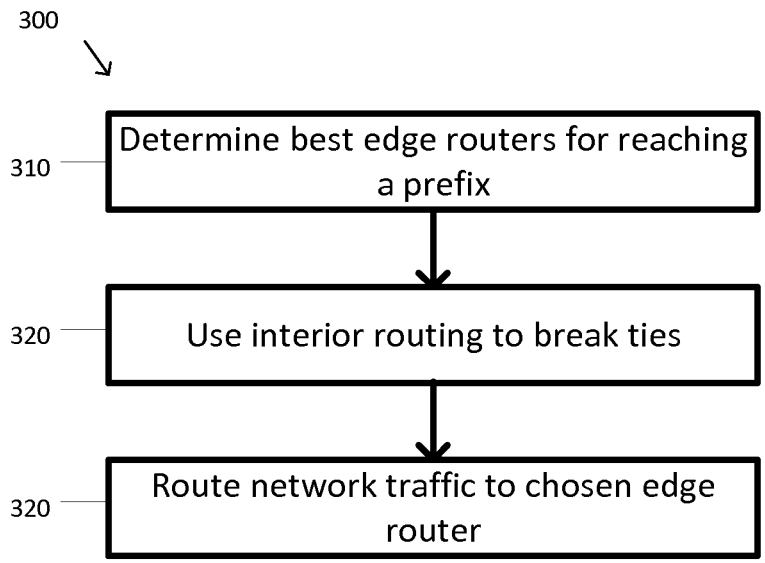
FIG. 3 is a simplified diagram showing a method of routing network traffic across an autonomous system according to some embodiments.

FIG. 3 is a simplified diagram showing a method 300 of routing network traffic across an autonomous system according to some embodiments. As shown in FIG. 3, the method 300 includes a process 310 for determining the best edge routers for reaching a prefix, a process 320 for using interior routing to break ties, and a process 330 for routing network traffic to a chosen edge router. According to certain embodiments, the method 300 of routing network traffic across an autonomous system can be performed using variations among the processes 310-330 as would be recognized by one of ordinary skill in the art. In some embodiments, one or more of the processes 310-330 of method 300 may be implemented, at least in part, in the form of executable code stored on non-transient, tangible, machine readable media that when run by one or more processors (e.g., one or more processors in the routers 210, 220, 230, 240, 250, and/or 271-278) may cause the one or more processors to perform one or more of the processes 310-330.

At the process 310, best edge routers for reaching a prefix are determined. In some examples, routing information shared between autonomous systems may be used to determine the best edge routers. In some examples, the BGP may be used to exchange the routing information. In some examples, the routing information may include information associated with other autonomous systems in paths toward the prefix. In some examples, information associated with one or more of hop counts, bandwidth, quality of service, and other metrics may be used to determine the best edge routers. In some examples, the process 310 may determine more than one best edge router for reaching the prefix.

At the process 320, interior routing may be used to break ties between the best edge routers. In some examples, when the process 310 determines more than one best edge router, costs associated with interior routing within the autonomous system may be used to break ties. In some examples, routing costs between different paths in the autonomous system may be used to choose which of the best edge routers should be used to route network traffic to the prefix. In some examples, the process 320 may be part of an IGP best path selection tie breaking procedure.

At the process 330, network traffic is routed to the chosen edge router. The network traffic is routed to the edge router chosen during the process 320. In some examples, the network traffic may be routed using a path through the autonomous system that has the lowest routing costs.

The method 300 will now be illustrated using the autonomous system 200 of FIG. 2. For example, assume that network traffic arrives at the edge router along the network link 262 and is to be routed to prefix 269. During the process 310, the edge routers 240 and 250 are determined to be the best edge routers and the tie breaking process 320 is needed to select the chosen edge router. There are 12 possible paths through the autonomous system 200 that network traffic may take between the router 220 and either of the best edge routers 240 and 250 for prefix 269 that do not involve loops. Six of the possible paths are to edge router 240 and include the paths 220-272-273-274-275-276-240, 220-272-273-274-275-278-277-276-240, 220-278-277-276-240, 220-271-278-277-276-240, 220-278-275-276-240, and 220-271-278-275-276-240. The other six possible paths are to edge router 250 using similar variations in the paths. Based on the routing costs, the best path is 220-272-273-274-275-276-240 to edge router 240 with a cost of 140. As a result, at the process 320, the edge router 240 may become the chosen router. At the process 330, the path 220-272-273-274-275-276-240 may be used to route the network traffic to the chosen edge router 240.

According to some embodiments, the routing costs and/or other routing information used to break ties during the process 320 may be expensive to determine. In some examples, when the Interior Border Gateway Protocol (IBGP) is used to determine the routing costs and/or the other routing information, it must maintain TCP connections between each of the edge routers in the autonomous system. As more edge routers are added to the autonomous system the number of TCP connections increases proportional to the square of the number of edge routers. In the example of FIG. 2, there are 5 edge routers, which requires 10 separate TCP connections. If the number of edge routers increases to 10, the number of separate TCP connections increases to 45. This is sometimes referred to as the full mesh problem. Accordingly, it would be advantageous to have more efficient routing strategies for use during the process 320.

Figure 4:
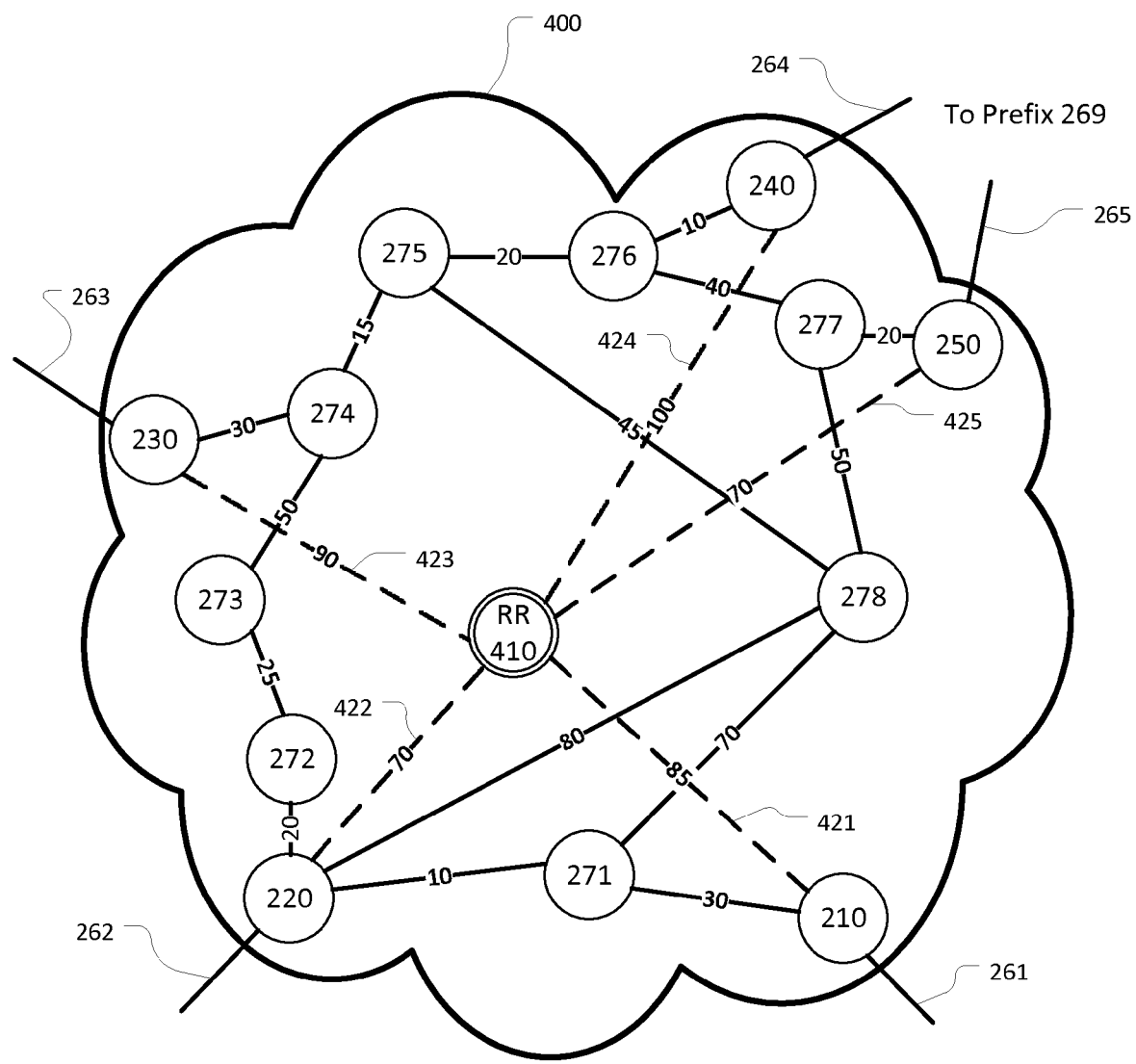
FIG. 4 is a simplified diagram of an autonomous system with a router reflector according to some embodiments.

One possible solution to the full mesh problem is to use a route reflector. FIG. 4 is a simplified diagram of an autonomous system 400 with a router reflector 410 according to some embodiments. As shown in FIG. 4, the autonomous system 200 of FIG. 2 is updated to include the route reflector 410 and to form the autonomous system 400. In some examples, the route reflector 410 may simplify routing between the edge routers 210, 220, 230, 240, and 250 by keeping an abbreviated set of virtual links between the edge routers 210, 220, 230, 240, and 250 that do not require maintenance of the full mesh of network paths between the edge routers 210, 220, 230, 240, and 250. As shown in FIG. 4, the virtual paths are denoted using dashed links with corresponding routing costs. The route reflector 410 maintains a virtual link between itself and each of the edge routers 210, 220, 230, 240, and 250. Each of these virtual links represent the routing cost between the route reflector 410 and the corresponding edge router 210, 220, 230, 240, or 250 as viewed from the perspective of the route reflector 410. A virtual link 421 indicates that the routing cost between the route reflector 410 and the edge router 210 is 85. Similarly, a virtual link 422 indicates that the routing cost between the route reflector 410 and the edge router 220 is 70, a virtual link 423 indicates that the routing cost between the route reflector 410 and the edge router 230 is 90, a virtual link 424 indicates that the routing cost between the route reflector 410 and the edge router 240 is 100, and a virtual link 425 indicates that the routing cost between the route reflector 410 and the edge router 250 is 70.

In some embodiments, the route reflector 410 may be used to recommend best routing paths across the autonomous system 400. In some examples, the route reflector 410 may recommend best paths to specific prefixes by recommending an edge router to that prefix. In some examples, the best path may be chosen based on the routing cost of the virtual link between the route reflector 410 and the recommended edge router. In some examples, the route reflector may recommend edge router 250 over edge router 240 for routing network traffic to prefix 269 because the routing cost over the virtual link 425 to edge router 250 is 70, which is lower than the routing cost of 100 over the virtual link 424 to edge router 240. In some embodiments, routing paths using the route reflector 410 are often discouraged to avoid having the route reflector 410 become a bottleneck.

Figure 5:
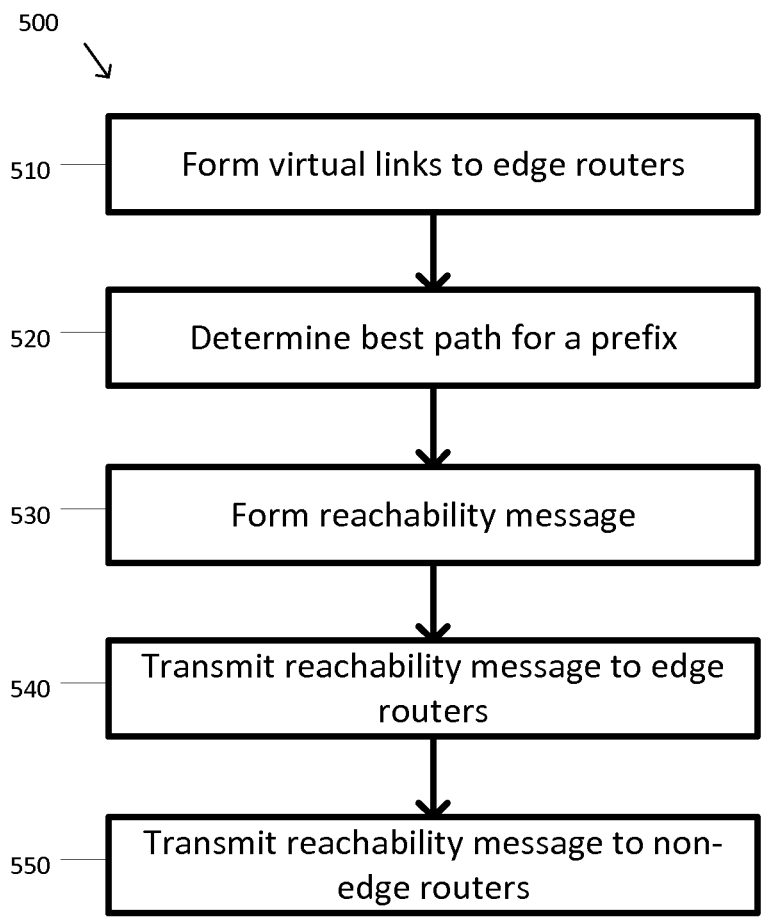
FIG. 5 is a simplified diagram showing a method of recommending edge routers in an autonomous system using a route reflector according to some embodiments.

FIG. 5 is a simplified diagram showing a method 500 of recommending edge routers in an autonomous system using a route reflector according to some embodiments. As shown in FIG. 5, the method 500 includes a process 510 for forming virtual links to edge routers, a method 520 for determining a best path for a prefix, a process 530 for forming a reachability message, a process 540 for transmitting the reachability message to edge routers, and a process 550 for transmitting the reachability message to non-edge routers. According to certain embodiments, the method 500 of recommending edge routers in an autonomous system using a route reflector can be performed using variations among the processes 510-550 as would be recognized by one of ordinary skill in the art. In some embodiments, one or more of the processes 510-550 of method 500 may be implemented, at least in part, in the form of executable code stored on non-transient, tangible, machine readable media that when run by one or more processors (e.g., one or more processors in the routers 210, 220, 230, 240, 250, 271-278, and/or 410) may cause the one or more processors to perform one or more of the processes 510-550.

At the process 510, virtual links to edge routers are formed. In some examples, a route reflector (e.g., the route reflector 410) forms virtual links to edge routers of an autonomous system. In some examples, the route reflector may exchange messages with each of the edge routers. In some examples, the route reflector may determine a routing cost to each of the edge routers. According to some embodiments, when the process 510 is applied to the autonomous system 400 of FIG. 4, the route reflector 410 may form the virtual links 421-425 with the edge routers 210, 220, 230, 240, and 250 respectively. In some examples, the route reflector 410 may also determine the routing costs of 85, 70, 90, 100, and 70 for the virtual links 421-425 respectively.

At the process 520, a best path for a prefix is determined. In some examples, the route reflector may determine which of the edge routers provide a route to the prefix. In some examples, the route reflector may determine that the edge router with the lowest routing cost on its corresponding virtual link is the best path across the autonomous for the prefix. According to some embodiments, when the process 520 is applied to the autonomous system 400 of FIG. 4, the route reflector 410 may determine that the edge router 250 is the best path to the prefix 269 because the routing cost of 70 over the virtual link 425 is lower than the routing cost of 100 over the virtual link 424 to edge router 240, which also provides a route to the prefix 269.

At the process 530, a reachability message is formed. In some examples, the route reflector may form a reachability message for the prefix of the process 520. In some examples, the reachability message may include the best path as determined in the process 520. In some examples, the reachability message may also include additional routing information for the best path.

At the process 540, the reachability message is transmitted to the edge routers. In some examples, the route reflector may transmit the reachability message formed during the process 530 to each of the edge routers in the autonomous system. In some examples, the best path included in the reachability message may be used by each of the edge routers to select as the path across the autonomous system for the indicated prefix. In some examples, each of the edge routers may use the best path included in the reachability message to break ties during the process 320. According to some embodiments, when the process 510 is applied to the autonomous system 400 of FIG. 4, when the edge router 220 receives network traffic for prefix 269, the edge router 220 may route the network traffic to edge router 250 based on the reachability message the edge router 220 received during the process 540.

At the process 550, the reachability message is transmitted to the non-edge routers. In some examples, the route reflector may transmit the reachability message formed during the process 530 to each of the non-edge routers in the autonomous system. In some examples, the best path included in the reachability message may be used by each of the non-edge routers to select the best path as the path out of the autonomous system for the indicated prefix.

According to some embodiments, because a route reflector provides only a simplification of routing costs and best paths across an autonomous system, the route reflector may not always recommend an optimal path across the autonomous system. In some examples, this may be illustrated using the autonomous system 400. When network traffic for the prefix 269 is received at the edge routers 210, 220, and/or 230, it should be routed to either edge router 240 or edge router 250. As noted previously, the route reflector 410 determines that edge router 250 is the best path to the prefix 269. A closer look at the routing costs in the autonomous system 400 reveals that the best paths determined by the route reflector 410 are not always a best choice. In the case of the edge router 210, a lowest routing cost path to edge router 240 is 210-271-278-275-276-240, with a routing cost of 175, and a lowest routing cost path to edge router 250 is 210-271-278-277-250, with a routing cost of 170. Thus, the route reflector 410 is recommending a correct best path to prefix 269 for edge router 210. The same is not true for the edge routers 220 and 230. For edge router 220, a lowest routing cost path to edge router 240 is 220-272-273-274-275-276-240, with a routing cost of 140, and a lowest routing cost path to edge router 250 is 220-278-277-250, with a routing cost of 150. Similarly, for edge router 230, a lowest routing cost path to edge router 240 is 230-274-275-276-240, with a routing cost of 75, and a lowest routing cost path to edge router 250 is 230-274-275-276-277-250, with a routing cost of 125. Thus, for edge routers 220 and 230, the route reflector 410 is not recommending a correct best path to prefix 269.

According to some embodiments, one possible solution to avoid having a route reflector recommend a best path to a prefix that is not the correct best path may be to transmit all possible paths to the prefix. In some examples, a reachability message (such as the reachability message formed during the process 530) may be formed for each edge router that provides a path to the prefix and transmitted to the edge routers and non-edge routers. For autonomous systems with large numbers of edge routers and supporting multiple edge routers to many prefixes, this may become too expensive in terms of bandwidth and/or memory. In some examples, the additional routing information for each path in the reachability message may be extensive and result in lengthy reachability messages.

According to some embodiments, one possible solution to avoid having a route reflector recommend a best path to a prefix that is not the correct best path may be to use multiple route reflectors. Each of the multiple router reflectors may transmit its own reachability message for each prefix, thus providing multiple potentially different recommendations for a best path. Overhead and costs for the multiple route reflectors may be high, especially for autonomous systems with large numbers of edge routers.

Figure 6:
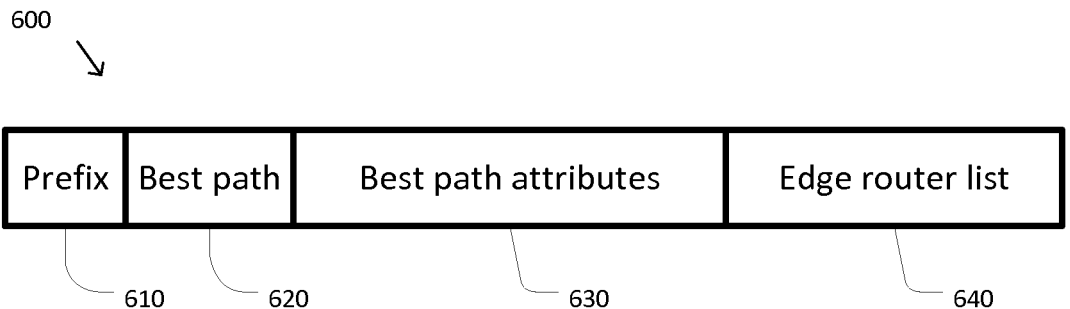
FIG. 6, is a simplified diagram of a reachability message including an edge router list according to some embodiments.

According to some embodiments, one possible solution to avoid having a route reflector recommend a best path to a prefix that is not the correct best path may be to transmit a list of edge routers with the reachability message. FIG. 6, is a simplified diagram of a reachability message 600 including an edge router list according to some embodiments. As shown in FIG. 6, the reachability message 600 includes fields for a prefix 610, a best path 620, best path attributes 630, and an edge router list 640. The prefix field 610 includes a prefix to which the reachability message 600 applies. In some examples, the reachability message 600 may provide routing information across an autonomous system for network traffic being routed to the prefix in the prefix field 610. The best path field 620 may include a best path as recommended by a route reflector. In some examples, the best path field 620 may include the best path determined during the process 520. The best path attributes field 630 may include additional routing information for the best path in the best path field 620. In some examples, the best path attributes field 630 may include hop counts, bandwidth, quality of service, and other metrics corresponding to the best path in the best path field 620. The edge routers list field 640 may include a list of edge routers, other than the edge router reflected in the best path found in the best path field 620.

According to some embodiments, the reachability message 600 may be substituted for the reachability message formed during the process 530. According to some embodiments, the process 530 includes forming the reachability message 600. According to some embodiments, the reachability message 600 is transmitted during the processes 540 and 550.

According to some embodiments, the reachability message 600 for prefix 269 in the autonomous system 400 of FIG. 4, may include the prefix field 610 including the prefix 269, the best path field 620 including information associated with the edge router 250, the best path attributed field 630 including information associated with the best path including the edge router 250, and the edge router list field 640 including information association associated with the edge router 240.

Figure 7:
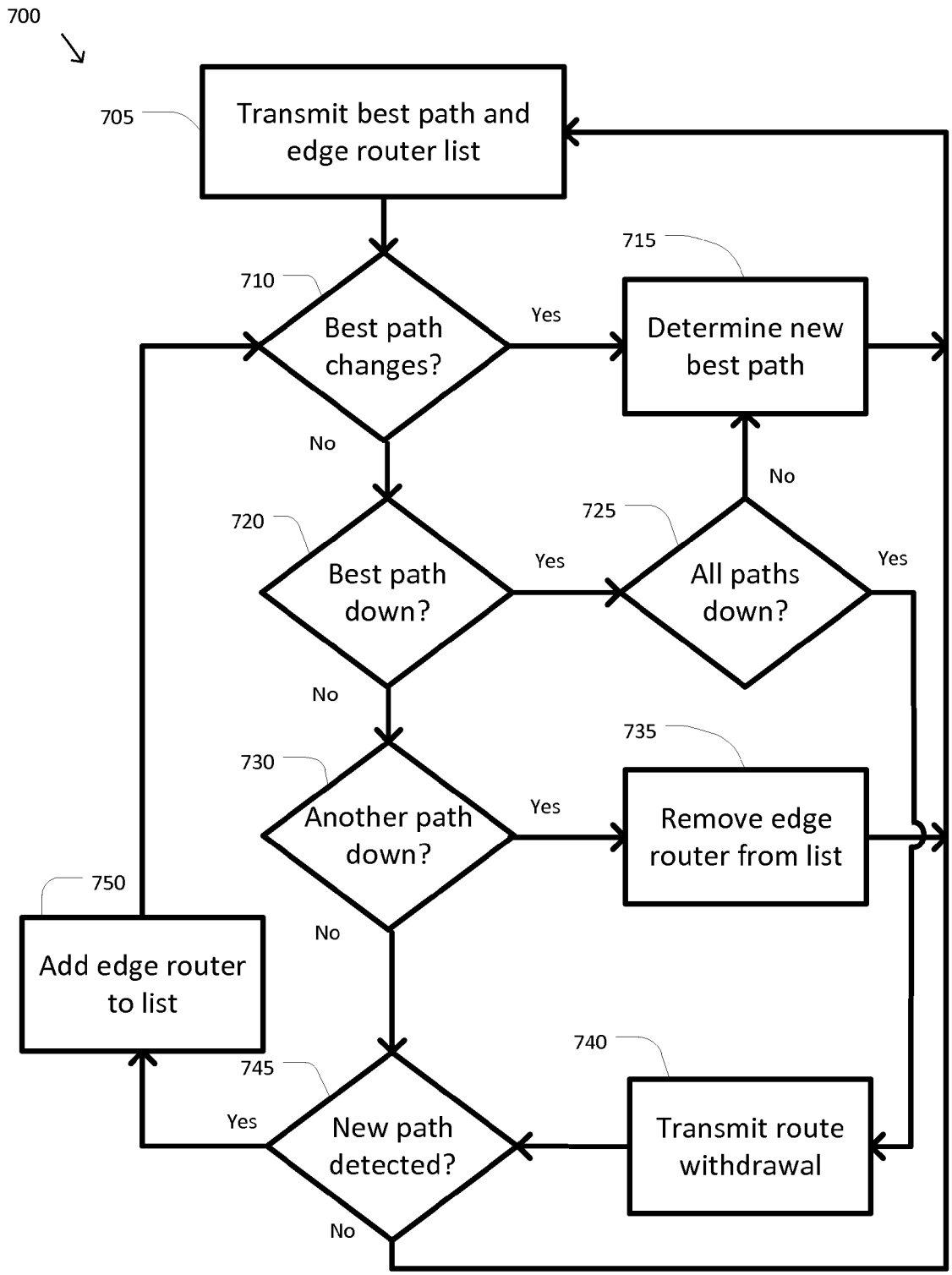
FIG. 7 is a simplified diagram showing a method of advertising routes across an autonomous system for a prefix according to some embodiments.

FIG. 7 is a simplified diagram showing a method 700 of advertising routes across an autonomous system for a prefix according to some embodiments. As shown in FIG. 7, the method 700 includes a process 705 for transmitting a best path and edge router list, a process 710 for detecting whether the best path changes, a process 715 for determining a new best path, a process 720 for detecting whether the best path is down, a process 725 for detecting when all paths are down, a process 730 for detecting whether another path is down, a process 735 for removing an edge router from the edge router list, a process 740 for transmitting a route withdrawal, a process 745 for determining whether a new path is detected, and a process 750 for adding an edge router to the list. According to certain embodiments, the method 700 of advertising routes across an autonomous system for a prefix can be performed using variations among the processes 705-750 as would be recognized by one of ordinary skill in the art. According to some embodiments, the method 700 may be applied only to one prefix. According to some embodiments, the method 700 may be applied to each prefix that network traffic in the autonomous system may need to reach. In some embodiments, one or more of the processes 705-750 of method 700 may be implemented, at least in part, in the form of executable code stored on non-transient, tangible, machine readable media that when run by one or more processors (e.g., one or more processors in the routers 210, 220, 230, 240, 250, 271-278, and/or 410) may cause the one or more processors to perform one or more of the processes 705-750.

At the process 705, a best path and edge router list are transmitted. In some embodiments, a route reflector may transmit a reachability message including a best path and an edge router list. In some examples, the route reflector is the route reflector 410. In some examples, the reachability message is the reachability message 600. In some examples, the reachability message may indicate how to route network traffic to a prefix. In some examples, the reachability message may be transmitted using the processes 540 and/or 550. According to some embodiments, the reachability message is used by routers in an autonomous system to aid in the selection of an edge router that can reach the prefix.

At the process 710, it is detected whether the best path changes. In some examples, routing costs within the autonomous system may change. In some examples, routers and/or network links within the autonomous system may fail and/or be returned to service. In some examples, when changes occur within the autonomous system, the best path across the autonomous system to the prefix may change. In some examples, a change in the best path may be detected during the process 710. When it is detected that the best path changes, a new best path is determined during the process 715. When it is detected that there is no change in the best path, the method 700 proceeds to the process 720.

At the process 715, the new best path is determined. In some examples, the route reflector may update routing costs associated with virtual links between the route reflector and each of the edge routers in the autonomous system. In some examples, the new best path may be determined using the process 520 to determine the best path to the edge routers. In some examples, once the new best path is determined, the edge router list may be updated to add a first edge router associated with the former best path and to remove a second edge router associated with the new path. Once the new best path is determined, the new best path and updated edge router list are transmitted using the process 705.

At the process 720, it is detected whether the best path is down. In some examples, the best path may be down when the edge router it is associated with is down. In some examples, the best path may be down when the network link between the edge router associated with the best path and another autonomous system is down. In some examples, the best path may be down when one or more routers and/or network links within the autonomous system are down and the edge router associated with the best path is unreachable using the autonomous system. When the best path is down, the method 700 proceeds to the process 725. When the best path is not down, the method 700 proceeds to the process 730.

At the process 725, it is detected whether all paths are down. In some examples, all paths are down when the prefix can no longer be reached by the autonomous system. When all paths are down, a route withdrawal request is transmitted using the process 740. When all paths are not down, the new best path is determined using the process 715.

At the process 730, it is detected whether another path is down. In some examples, another path may be down when any edge router in the edge router list of process 705 is down. In some examples, another path may be down when the network link between any edge router in the edge router list of process 705 and another autonomous system is down. In some examples, another path may be down when one or more routers and/or network links within the autonomous system are down and any edge router in the edge router list of process 705 is unreachable using the autonomous system. When another path is down, an edge router is removed from the edge router list using the process 735. When another path is not down, the method 700 proceeds to the process 745.

At the process 735, an edge router is removed from the edge router list. In some examples, when another path is down, the edge router associated with the another path may be removed from the edge router list. Once the edge router is removed from the edge router list, the updated edge router list is transmitted using the process 705.

At the process 740, a route withdrawal request is transmitted. In some examples, the route reflector may notify the routers in the autonomous system that the prefix is no longer reachable. In some examples, the method 700 may wait at the process 740 until a new path is detected during the process 745.

At the process 745, it is determined whether a new path is detected. In some examples, a new path may be detected when one or more routers and/or network links that were previously down are now up and available for use. In some examples, a new path may be detected when the prefix becomes reachable using an edge router not associated with the best path and/or the edge router list. When a new path is detected, a corresponding edge router is added to the edge router list using the process 750. When a new path is not detected, the best path and edge router list are transmitted using the process 705.

At the process 750, an edge router is added to the edge router list. In some examples, the edge router corresponding to the new path detected during the process 745 may be added to the edge list. In some examples, the new path detected during the process 745 may be a new best path. After the corresponding edge router is added to the edge router list, it is determined whether the new path causes a change in the best path using the process 710.

Figure 8:
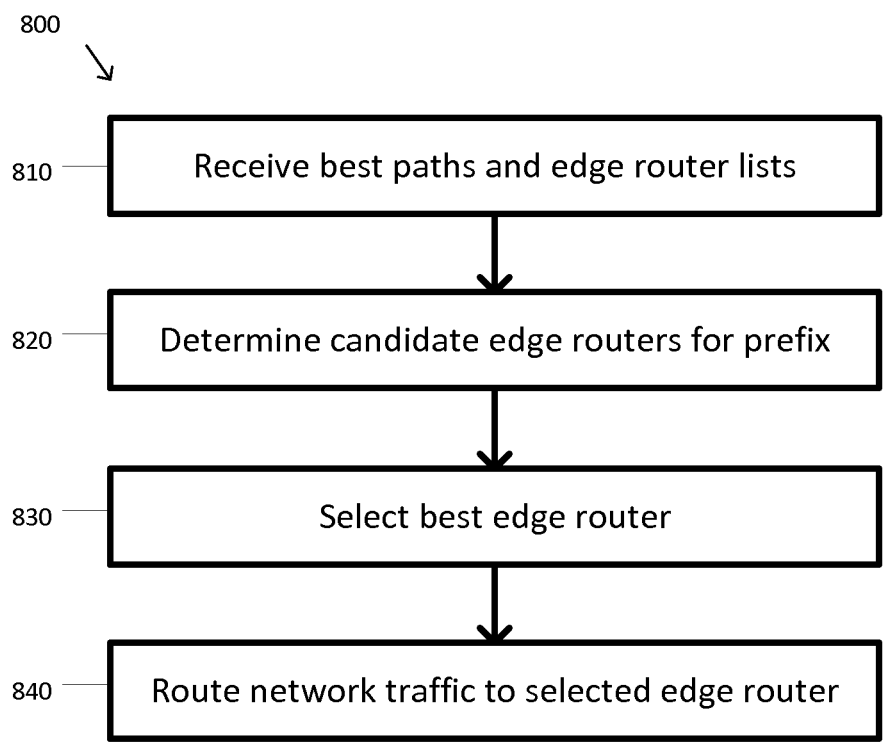
FIG. 8 is a simplified diagram showing a method of routing network traffic in an autonomous system according to some embodiments.

FIG. 8 is a simplified diagram showing a method 800 of routing network traffic in an autonomous system according to some embodiments. As shown in FIG. 8, the method 800 includes a process 810 for receiving best paths and edge router lists, a process 820 for determining candidate edge routers for a prefix, a process 830 for selecting a best edge router, and a process 840 for routing network traffic to the selected edge router. According to certain embodiments, the method 800 of routing network traffic in an autonomous system can be performed using variations among the processes 810-840 as would be recognized by one of ordinary skill in the art. In some embodiments, one or more of the processes 810-840 of method 800 may be implemented, at least in part, in the form of executable code stored on non-transient, tangible, machine readable media that when run by one or more processors (e.g., one or more processors in the routers 210, 220, 230, 240, 250, 271-278, and/or 410) may cause the one or more processors to perform one or more of the processes 810-840.

At the process 810, best paths and edge routers lists are received. According to some embodiments, a best path and edge router list may be received for each prefix reachable using the autonomous system. In some examples, each best path and edge router list may be received in the form of the reachability message 600. In some examples, each best path and edge router list may be received from a route reflector. In some examples, the route reflector may have transmitted each best path and edge router list using the process 705. According to some embodiments, each best path and edge router list indicates edge routers that may be used to route network traffic to the corresponding prefix.

At the process 820, candidate edge routers for a prefix are determined. In some examples, the best path and edge router list received during the process 810 that is associated with the prefix may be used to determine the candidate edge routers. In some examples, the process 820 may include the process 310. In some examples, the process 820 may determine more than one candidate edge router for reaching the prefix.

At the process 830, a best edge router is selected. In some examples, when the process 820 determines more than one candidate edge router, costs associated with interior routing within the autonomous system may be used to break ties. In some examples, routing costs between different paths in the autonomous system may be used to choose which of the candidate edge routers should be used to route network traffic to the prefix. In some examples, the selected best edge router may be the edge router associated with the best path for the prefix. In some examples, the best edge router may be selected from the edge router list for the prefix. In some examples, the best edge router is selected to have the lowest routing costs between the router and the selected edge router. In some examples, the process 830 may be part of an IGP best path selection tie breaking procedure.

At the process 840, network traffic is routed to the selected edge router. The network traffic is routed to the edge router selected during the process 830. In some examples, the network traffic may be routed using a path through the autonomous system to the selected edge routers that has the lowest routing costs.

Some embodiments of routers 210, 220, 230, 240, 250, 271-278, and/or 410 may include non-transient, tangible, machine readable media that include executable code that when run by one or more processors may cause the one or more processors to perform the processes of methods 300, 500, 700, and/or 800 as described above. Some common forms of machine readable media that may include the processes of methods 300, 500, 700, and/or 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of advertising routes, the method comprising:
identifying a plurality of first edge routers for an autonomous system;
selecting a plurality of second edge routers from the plurality of first edge routers, a first prefix being reachable using the plurality of second edge routers;
determining a third edge router, the third edge router being associated with a first path for reaching the first prefix, the third edge router being selected from the plurality of second edge routers, and the first path being a best path for reaching the first prefix;
forming an edge router list consisting of the plurality of second edge routers except for the third edge router;
forming a first reachability message including the first prefix, the first path, information associated with the first path, and the edge router list, but not including paths for reaching edge routers in the edge router list; and
transmitting the first reachability message.

2. The method of claim 1 wherein the first reachability message is transmitted to a plurality of fourth routers.

3. The method of claim 2 wherein the plurality of fourth routers include the plurality of first edge routers and one or more non-edge routers of the autonomous system.

4. The method of claim 1 wherein the routes are advertised by a route reflector.

5. The method of claim 4, further comprising determining the first path based on information associated with routing costs between the route reflector and the third edge router.

6. The method of claim 1, further comprising determining the first path based on information associated with routing costs to reach the third edge router.

7. The method of claim 6 wherein the first path has a lowest routing cost among all routing costs to reach any of the plurality of second edge routers.

8. The method of claim 1, further comprising:
detecting whether the first path changes; and
when the first path changes:
determining a second path, the second path being a new best path for reaching the first prefix;
forming a second reachability message including information associated with the second path; and
transmitting the second reachability message.

9. The method of claim 8, further comprising:
when a fourth edge router associated with the second path is different from the third edge router:
updating the edge router list by adding the third edge router to the edge router list and removing the fourth edge router from the edge router list;
wherein the second reachability message further includes the updated edge router list.

10. The method of claim 1, further comprising:
detecting whether the first path is down; and
when the first path is down:
determining a second path, the second path being a new best path for reaching the first prefix;
forming a second reachability message including information associated with the second path; and
transmitting the second reachability message.

11. The method of claim 10, further comprising:
detecting whether all paths to the first prefix are down; and
transmitting a route withdrawal message for the first prefix when all paths to the first prefix are down.

12. The method of claim 11, further comprising:
when all paths to the first prefix are down:
waiting until the first prefix is reachable using a third path;
forming a third reachability message including information associated with the third path; and
transmitting the third reachability message.

13. The method of claim 1, further comprising:
detecting whether a second path associated with a fourth edge router is down, the edge router list including the fourth edge router; and
when the second path associated with the fourth edge router is down:
updating the edge router list by removing the fourth edge router from the edge router list;
forming a second reachability message including the updated edge router list; and
transmitting the second reachability message.

14. The method of claim 1, further comprising:
detecting a new path for reaching the first prefix, the new path being associated with a fourth edge router;
when the new path for reaching the first prefix is detected:
detecting whether the new path is better than the first path;
when the new path is better than the first path:
updating the edge router list by adding the third edge router to the edge router list;
forming a second reachability message including information associated with the new path and the updated edge router list; and
transmitting the second reachability message; and
when the new path is not better than the first path:
updating the edge router list by adding the fourth edge router to the edge router list;
forming a third reachability message including information associated with the updated edge router list; and
transmitting the third reachability message.

15. The method of claim 1, further comprising:
selecting a plurality of fourth edge routers from the plurality of first edge routers, a second prefix being reachable using the plurality of fourth edge routers;

determining a fifth edge router, the fifth edge router being associated with a second path for reaching the second prefix, the fifth edge router being selected from the plurality of fourth edge routers, and the second path being a best path for reaching the second prefix;

forming another edge router list consisting of the plurality of fourth edge routers except for the fifth edge router;

forming a second reachability message including the second prefix, the second path, information associated with the second path, and the another edge router list, but not including paths for reaching edge routers in the another edge router list; and transmitting the second reachability message.

16. A method of routing, the method comprising:

receiving a first reachability message including a first prefix, a first path for reaching the first prefix via a first edge router, information associated with the first path, and a first edge router list consisting only of edge routers other than the first edge router that are usable to reach the first prefix, but not including paths for reaching edge routers in the first edge router list, each of the first edge router and the edge routers in the first edge router list being part of an autonomous system;

selecting a second edge router from the first edge router and the edge routers in the first edge router list based on information associated with routing costs to the first edge router and the edge routers in the first edge router list;

receiving network traffic for the first prefix; and routing the network traffic for the first prefix toward the selected second edge router.

17. The method of claim 16 wherein a routing cost to the first edge router is a lowest routing cost among all routing costs to reach any of the first edge router and the edge routers in the first edge router list.

18. The method of claim 16, further comprising:

receiving a second reachability message including a second prefix, a second path for reaching the second prefix via a third edge router, information associated with the second path, and a second edge router list consisting only of edge routers other than the third edge router that are usable to reach the second prefix, but not including paths for reaching edge routers in the second edge router list, each of the third edge router and the edge routers in the second edge router list being part of the autonomous system;

selecting a fourth edge router from the third edge router and the edge routers in the second edge router list based on information associated with routing costs to the third edge router and the edge routers in the second edge router list;

receiving network traffic for the second prefix; and routing the network traffic for the second prefix toward the selected fourth edge router.

19. An information handling system comprising:

a communications network, the communications network including:

a router;

wherein the router is configured to:

identify a plurality of first edge routers for an autonomous system;

select a plurality of second edge routers from the plurality of first edge routers, a prefix being reachable using the plurality of second edge routers;

determine a third edge router, the third edge router being associated with a path for reaching the prefix, the third edge router being selected from the plurality of second edge routers, and the path being a best path for reaching the prefix;

form an edge router list consisting of the plurality of second edge routers except for the third edge router;

form a reachability message including the prefix, the path, information associated with the path, and the edge router list, but not including paths for reaching edge routers in the edge router list; and transmit the reachability message.

* * * * *